United States Patent
Ackerman

(10) Patent No.: US 7,628,879 B2
(45) Date of Patent: Dec. 8, 2009

(54) CONDUCTIVE SCRIM EMBEDDED STRUCTURAL ADHESIVE FILMS

(75) Inventor: Patrice K Ackerman, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/844,174

(22) Filed: Aug. 23, 2007

(65) Prior Publication Data

US 2009/0053406 A1   Feb. 26, 2009

(51) Int. Cl.
| | |
|---|---|
| B29C 73/00 | (2006.01) |
| B32B 43/00 | (2006.01) |
| B32B 37/00 | (2006.01) |
| B29C 65/00 | (2006.01) |
| B64D 45/02 | (2006.01) |
| B64C 1/10 | (2006.01) |
| B64D 7/00 | (2006.01) |
| H02H 1/00 | (2006.01) |
| H02H 1/04 | (2006.01) |
| H02H 3/22 | (2006.01) |
| H02H 9/06 | (2006.01) |
| H05F 3/00 | (2006.01) |

(52) U.S. Cl. .................. 156/98; 156/94; 156/298; 156/304.1; 244/1 A; 244/121; 361/117; 361/218; 428/63

(58) Field of Classification Search ............ 156/94, 156/98, 298, 304.5, 304.1; 244/1 A, 121, 244/133, 126; 29/402.09, 402.11; 361/117, 361/217, 218; 428/63, 57, 58, 60, 61
See application file for complete search history.

(56) References Cited

U.S. PATENT DOCUMENTS

| | | | | |
|---|---|---|---|---|
| 4,352,142 | A | * | 9/1982 | Olson .................... 361/218 |
| 4,428,867 | A | | 1/1984 | Billias et al. |
| 4,448,838 | A | * | 5/1984 | McClenahan et al. ...... 442/229 |
| 4,839,771 | A | * | 6/1989 | Covey ................... 361/218 |
| 5,160,771 | A | * | 11/1992 | Lambing et al. .......... 428/57 |
| 5,338,827 | A | * | 8/1994 | Serafini et al. ........... 528/353 |
| 5,806,796 | A | * | 9/1998 | Healey ................. 244/117 R |
| 5,863,667 | A | * | 1/1999 | Poggi .................... 428/608 |

(Continued)

FOREIGN PATENT DOCUMENTS

EP   0583062   2/1994

(Continued)

OTHER PUBLICATIONS

PCT Intl Search Report and Written Opinion for Application No. PCT/US2008/073869, dated Oct. 20, 2008, 17 pgs.

*Primary Examiner*—Jeff Aftergut
*Assistant Examiner*—Brian R Slawski
(74) *Attorney, Agent, or Firm*—Lee & Hayes, PLLC

(57) ABSTRACT

Systems and methods for providing a structural adhesive film that includes a conductive scrim layer are disclosed. In one embodiment, a method for producing a structural adhesive film includes providing a first resin adhesive layer. The first resin adhesive layer is configured to bind to a first carbon fiber ply. The method also includes providing a second resin adhesive layer. The second adhesive layer is configured to bind to a second carbon fiber ply. The method also includes providing a conductive scrim that is embedded between the first resin adhesive layer and the second resin adhesive layer. In some embodiments, the conductive scrim is infused with resin adhesive.

25 Claims, 10 Drawing Sheets

U.S. PATENT DOCUMENTS

| | | | |
|---|---|---|---|
| 5,958,166 A * | 9/1999 | Walters et al. | 156/94 |
| 6,174,392 B1 * | 1/2001 | Reis | 156/58 |
| 2004/0118579 A1 | 6/2004 | McCutcheon et al. | |
| 2005/0150596 A1 * | 7/2005 | Vargo et al. | 156/324 |
| 2005/0242471 A1 | 11/2005 | Bhatt et al. | |
| 2006/0060690 A1 * | 3/2006 | Aisenbrey | 244/1 R |

FOREIGN PATENT DOCUMENTS

| | | |
|---|---|---|
| JP | 2004087824 | 3/2004 |
| WO | WO2006023860 | 3/2006 |
| WO | WO2008005782 | 1/2008 |

* cited by examiner

CONDUCTIVE SCRIM EMBEDDED STRUCTURAL ADHESIVE FILMS

TECHNICAL FIELD

The present disclosure relates to systems and methods for using structural adhesives, and more specifically, to systems and methods for the use of structural adhesive films in repairing carbon fiber reinforced plastic (CFRP) components.

BACKGROUND

Aircraft, such as commercial airliners, typically experience some lightning strikes during their service life. In some cases, an aircraft may be struck by lightning as frequently as twice a year. Metallic components on an aircraft may conduct away electrical energy produced by lightning strikes, thus diminishing the force of electromagnetic discharges and minimizing any resultant undesirable effects. However, carbon fiber reinforced components, such as carbon fiber reinforce plastic (CFRP) components, are generally more susceptible to undesirable effects because they are generally not electrically conductive. As a result, electrical energy from lighting strikes may be concentrated in a small area, thus creating electrical arcing and thermal energy within carbon fiber reinforced components. Moreover, because electrical discharges from lightning strikes generally seek the path of least resistance to ground, electrical current may "move" through the carbon fiber reinforced components.

Accordingly, carbon fiber reinforced components of an aircraft may be provided with electrical discharge features, (e.g., external metallic foil strips attached to metallic fasteners) to safely dissipate the electric discharge over a large area. Alternatively, carbon fiber reinforced components on an aircraft may be covered with conductive meshes (e.g., aluminum mesh or copper mesh), to form conductive paths along the exterior of the aircraft. These conductive paths form what is known as an electromagnetic field (EMF) shield for the carbon fiber reinforced components. In other instances, a conductive mesh may be incorporated into the laminate plies that make up a carbon fiber reinforced component. Discontinuities to the EMF shield may be undesirable.

Therefore, novel systems and methods which restore the conductivity of carbon fiber reinforced plies as part of a structural repair, or restore the EMF shield of the carbon fiber reinforced component to its original or near original conductive capability, would have utility.

SUMMARY

Systems and methods for providing structural adhesive films that include conductive scrims are disclosed. Embodiments of systems and methods in accordance with the present disclosure may advantageously restore the conductive path of the electromagnetic field (EMF) shield, as well as the electrical conductivity of carbon fiber reinforced plies, during the structural repair of carbon fiber reinforced components.

In one embodiment, a structural adhesive film for binding carbon fiber laminate plies includes a first resin adhesive layer. The first resin adhesive layer is configured to bind to a first carbon fiber ply. The structural adhesive film also includes a second resin adhesive layer. The second resin adhesive layer is configured to bind to a second carbon fiber ply. The structural adhesive film further includes a resin adhesive infused conductive scrim embedded between the first resin adhesive layer and the second resin adhesive layer.

In another embodiment, a method for producing a structural adhesive film includes providing a first resin adhesive layer. The first resin adhesive layer is configured to bind to a first carbon fiber ply. The method includes providing a second resin adhesive layer. The second adhesive layer is configured to bind to a second carbon fiber ply. The method also includes providing a resin adhesive infused conductive scrim that is disposed between the first resin adhesive layer and the second resin adhesive layer.

In an additional embodiment, a method for using a conductive scrim embedded structural adhesive film includes preparing a repair area for adhesion of first laminate plies. The method further includes disposing a first conductive structural adhesive film on top of the repair area. The structural adhesive film includes a conductive scrim. The method further includes disposing one or more first laminate plies on top of the conductive structural adhesive film and curing the one or more first laminate plies. In additional embodiments, preparing the repair area for adhesive on laminate plies includes providing a recess into a damaged portion of a reinforced component. The recess being one of a tapered recess or a stepped recess. Moreover, preparing the repair area may further include inserting a second structural adhesive film into the recess, as well as inserting one or more second laminate plies into the recess. The one or more second laminate plies are also cured. According to various embodiments, the laminate plies include carbon fiber laminate plies, and the reinforced component includes a carbon fiber reinforced component.

The features, functions, and advantages that have been discussed above or will be discussed below can be achieved independently in various embodiments, or may be combined in yet other embodiments, further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

Embodiments of systems and methods in accordance with the present disclosure are directed to restoring electrical conductivity during the structural repairs of carbon fiber reinforced components. Many specific details of certain embodiments are set forth in the following description and in FIGS. 1-11 to provide a thorough understanding of such embodiments. The present disclosure may have additional embodiments, or may be practiced without one or more of the details described below.

Generally, embodiments of systems and methods in accordance with the present disclosure restore the electrical conductivity of replacement carbon fiber plies to the surrounding carbon fiber piles of a carbon fiber reinforced component. The embodiments of systems and methods may also restore the electrical continuity of a conductive mesh embedded in a carbon fiber reinforced component. The systems and methods are achieved via a structural adhesive film that includes an electrically conductive scrim. The electrically conductive scrim not only helps to support the adhesive during application and cure, but also provides conductive paths around the repair area to enable electrical connections to the surrounding carbon plies or the conductive mesh. Thus, these embodiments may advantageously reduce or eliminate electrical arcing between the repair area and the undamaged portion of the carbon fiber reinforced component.

Figure 1:
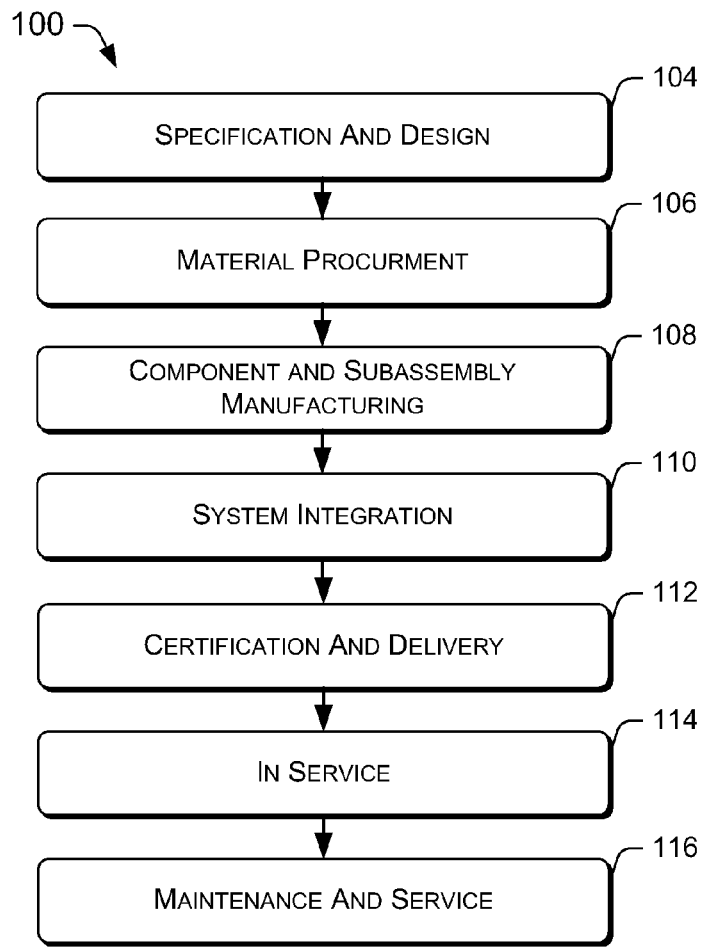
FIG. 1 is a flow diagram of an aircraft manufacturing and service method.
Figure 2:
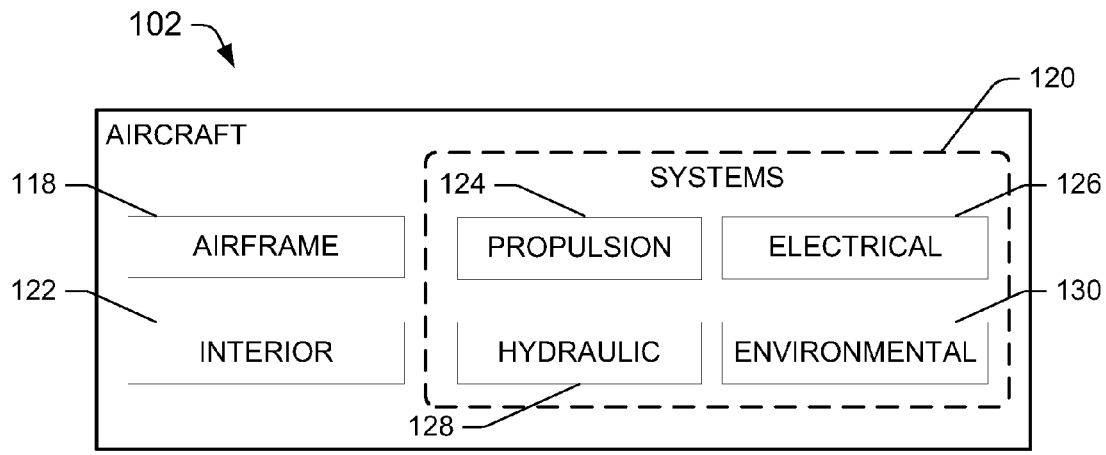
FIG. 2 is a block diagram of an aircraft produced according to the manufacturing and service method described in FIG. 1.

Referring more particularly to the drawings, embodiments of the disclosure may be described in the context of an aircraft manufacturing and service method 100 as shown in FIG. 1, and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3:
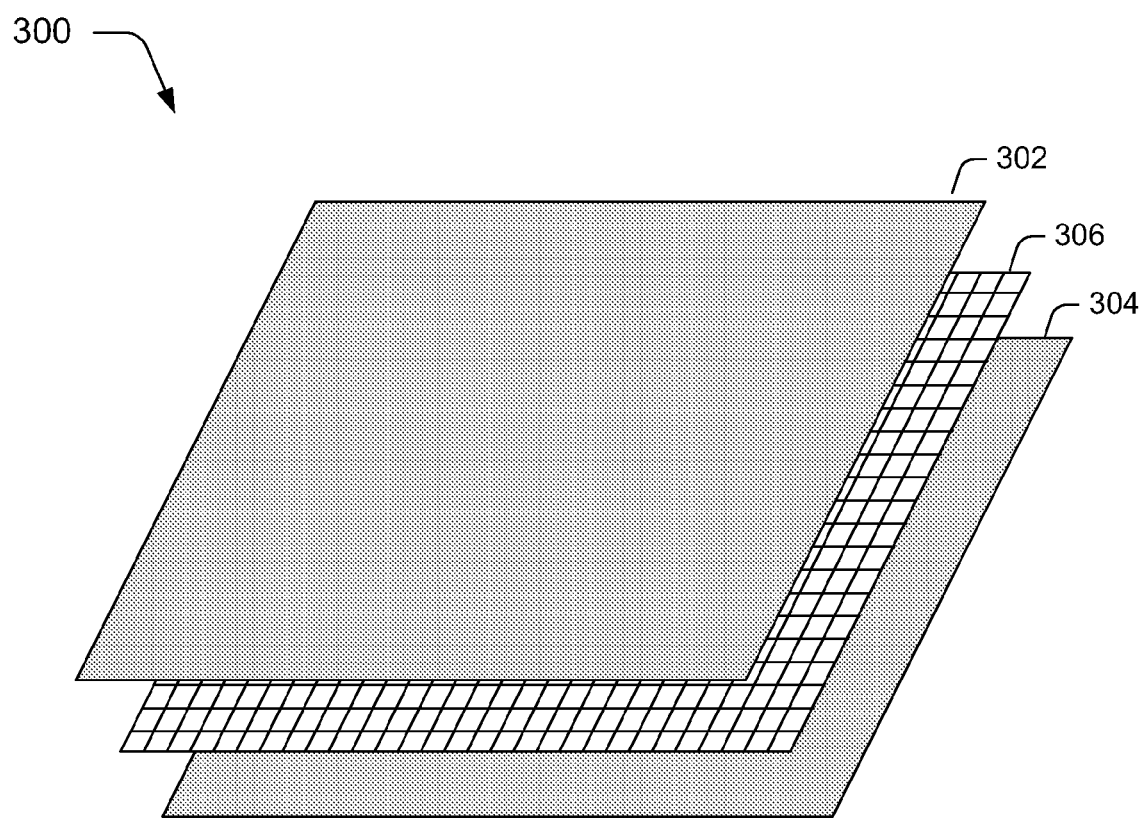
FIG. 3 is an isometric views illustrating exemplary structural adhesive films that include conductive scrims in accordance with an embodiment of the present disclosure.

FIG. 3 is an isometric view illustrating structural adhesive films that include conductive scrims, in accordance with embodiments of the present disclosure. Specifically, FIG. 3 depicts an exemplary structural adhesive film 300. The exemplary structural adhesive film 300 includes a first resin adhesive layer 302 and a second resin adhesive layer 304. The first resin adhesive layer 302 and the second resin adhesive layer 304 are configured to bond to carbon fiber laminate plies, such as carbon-fiber reinforced plastic (CFRP) plies. In various embodiments, each of the first resin adhesive layer 302 and the second adhesive layer 304 may include one of a prepreg film or paste. A conductive scrim layer 306 is disposed between the first resin adhesive layer 302 and the second resin adhesive layer 304. According to various implementations, the conductive scrim layer 306 may be embed into and adhere to both the first resin adhesive layer 304 and the second resin adhesive layer 304. In particular implementations, the conductive scrim layer 306 may be pressed into both the first resin layer 102 and the second resin layer 304 so that it is infused with resin from both resin layers. The conductive scrim layer 306 is configured to provide continuous electrical conductivity throughout the exemplary structural adhesive film 300, and may also serve as a binding matrix that gives form to the film.

According to various embodiments, the conductive scrim layer 306 may be in any configuration, such as without limitation, of a mesh, knitted mat, or random fiber mat comprised of intersecting strands of conductive fibers. Collectively, these various mesh and mats are also known as carriers. The conductive fibers may include both metallic and non-metallic materials. For example, the conductive fibers may be made of typical ductile conductors (e.g., copper, aluminum, platinum, silver, or alloys that include such metals). In another example, the conductive fibers may also be manufactured from non-metallic conductors such as graphite.

According to various embodiments, the conductive scrim layer 316 may be in any configuration, such as and without limitation, a mesh, knitted mat, or random fiber mat comprised of intersecting strands of conductive fibers. The conductive fibers may include both metallic and non-metallic materials. For example, the conductive fibers may be made of typical ductile conductors (e.g., copper, aluminum, platinum, silver, or alloys that include such metals). In another example, the conductive fibers may also be manufactured from non-metallic conductors such as graphite.

It will be appreciated that while FIG. 3 shows an embodiment of an conductive scrim embedded structural adhesive film, a variety of other embodiments may be constructed. For example, additional embodiments may include a plurality of conductive scrim layers.

Figure 4A:
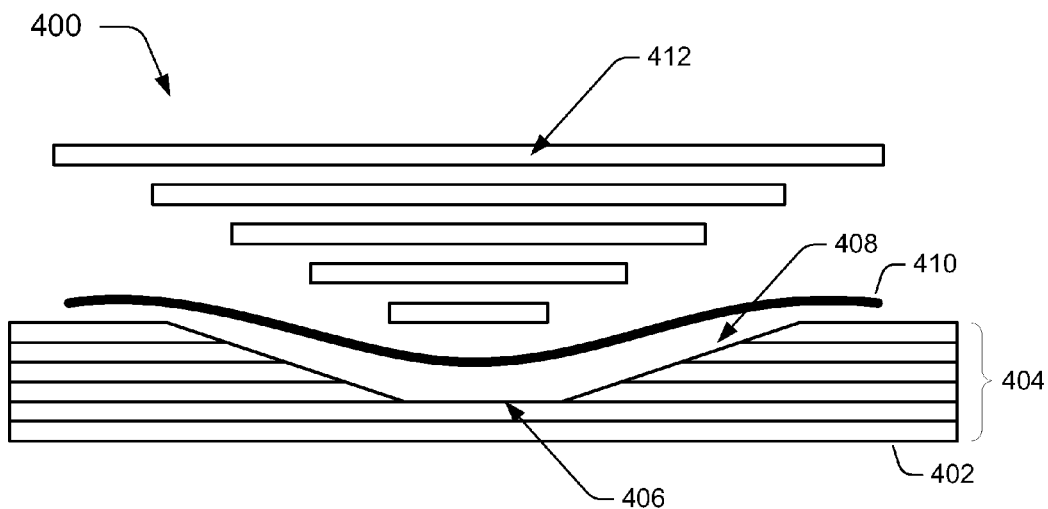
FIGS. 4a and 4b are side views of exemplary scarf techniques for repairing composite laminate components using an exemplary structural adhesive film described in FIG. 3.
Figure 4B:
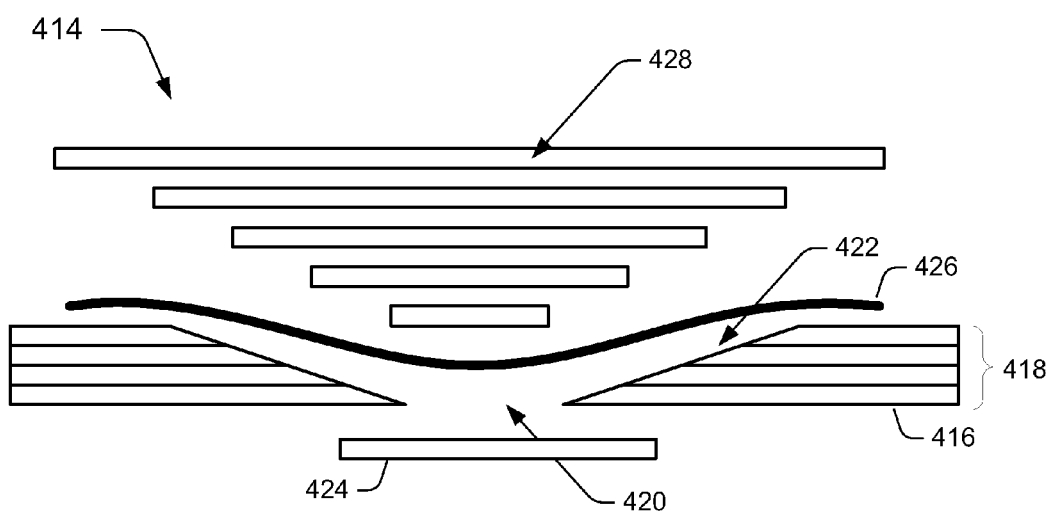

FIGS. 4a and 4b are side views of exemplary techniques 400 and 414 for repairing composite laminate components using an exemplary structural adhesive film described in FIG. 3. Specifically, FIG. 4a illustrates an exemplary technique 400 for the repair of non-through penetration of a carbon fiber reinforced component. Additionally, FIG. 4b illustrates an exemplary technique 414 for the repair of through-penetration of a carbon fiber reinforced component. Exemplary repair techniques 400 and 414 may be referred to herein as a "scarf" repair technique.

Repair technique 400 may be performed on a carbon fiber reinforced component 402, which may be a carbon fiber reinforced plastic (CFRP) component. The carbon fiber reinforced component 402 may include multiple plies 404 of carbon fiber laminates.

As shown in FIG. 4a, carbon fiber reinforced component 402 may include a non-through penetration repair area 406, (e.g., dents, cracks, fissures, etc.). The repair area 406 may be prepared for repair by the removal of portions from successive layers of plies to form a tapered recess 408. Moreover, the corners of the recess 408 may also be rounded off. The removal of portions from successive layers to form the recess 408 may be accomplished using any suitable manufacturing tool or process, such as a high-speed grinder. The tapering of the recess 408 may be adjusted as a function of the load experienced by the carbon fiber reinforced component 402. For instance, if the carbon fiber reinforced component 402 experiences a light load, a steep taper may be used. However, if the carbon fiber reinforced component 402 is subjected to a heavy load, a more gradual taper grade may be utilized.

The repair technique 400 includes the placement of a conductive scrim embedded structural adhesive film 410 into the recess 408. The structural adhesive film 410 may be the structural adhesive film described above and shown in FIG. 3. One or more plies of replacement laminates 412 may then be placed over the structural adhesive film 410 to restore the repair area 408.

It will be appreciated that the conductive scrim embedded structural adhesive film 410 is positioned between the plies of the tapered recess 408 and one or more plies of the replacement laminate 412 such that sufficient electrical contact is established between the two assemblages of plies. This electrical contact may act to ensure that any lightning discharges directed to the replacement laminates 412 is adequately conducted away into the surrounding plies 404 of carbon fiber laminates. Thus, the electrical discharge from the lightning may be dispersed from the non-through penetration repair area 406 to a bigger area to minimize its impact. In some implementations, the electrical discharge may also travel to one or more electrical discharge features.

FIG. 4b illustrates an exemplary technique 414 for the repair of through-penetration of a carbon fiber reinforced component. Repair technique 414 may be performed on a carbon fiber reinforced component 416, which may be a carbon fiber reinforced plastic (CFRP) component. The carbon fiber reinforced component 416 may include multiple plies 418 of carbon fiber laminates.

As shown in FIG. 4b, carbon fiber reinforced component 416 may include a through-penetration repair area 420, (e.g., a puncture that completely penetrates carbon fiber reinforced component 416). The repair area 420 may be prepared for repair in substantially the same way as the repair area 406 to form a tapered recess 422.

Additionally, the repair technique 414 includes the placement of one or more backup plies 424 on the inner side of through-penetration repair area 420. A conductive scrim embedded structural adhesive film 426 is placed into the tapered recess 422. The structural adhesive film 426 may be the structural adhesive film described above and shown in FIG. 3. One or more plies of replacement laminates 428 may then be placed over the structural adhesive film 426 to restore the repair area 420.

It will be appreciated that the conductive scrim embedded structural adhesive film 426 is positioned between the plies of the tapered recess 422, the one or more backup plies 424, and the one or more plies of the replacement laminate 428 such that sufficient electrical contact is established between the assemblages of plies. This electrical contact may act to ensure that any lightning discharges directed to the replacement laminates 428 is adequately conducted away into the surrounding plies 418 of carbon fiber laminates. Thus, the electrical discharge from the lightning may be dispersed from the through-penetration repair area 420 to a bigger area to minimize its impact. In some implementations, the electrical discharge may also travel to one or more electrical discharge features.

Figure 5A:
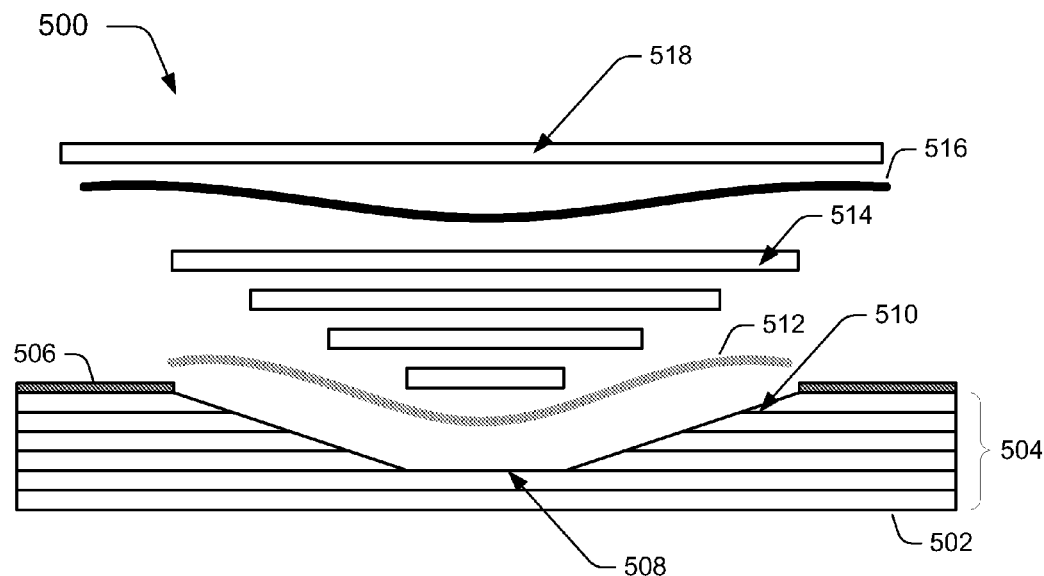
FIGS. 5a and 5b are side views of exemplary scarf techniques for repairing mesh-covered composite laminate components using an exemplary structural adhesive film described in FIG. 3.
Figure 5B:
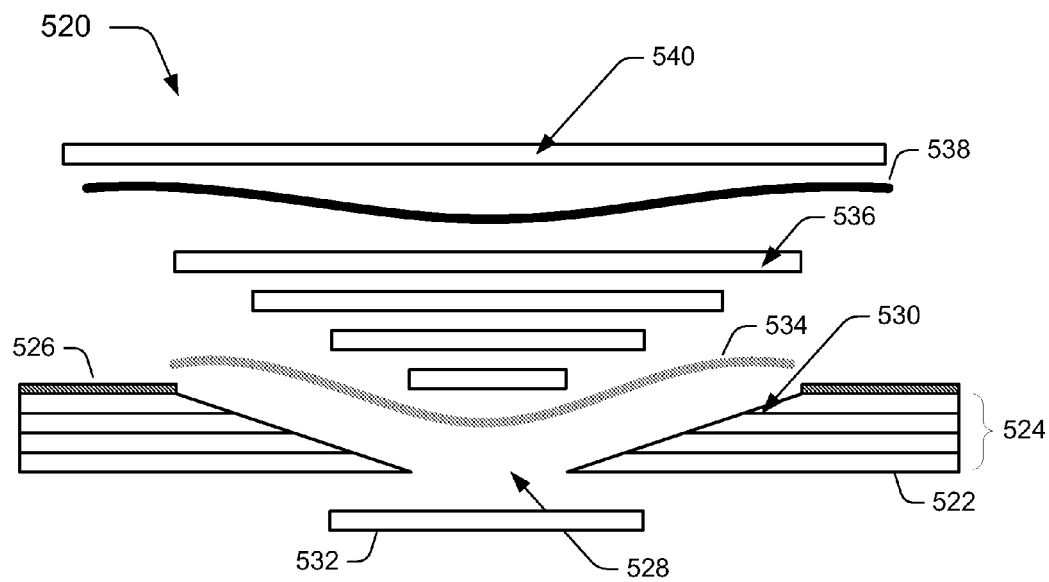

FIGS. 5a and 5b are side views of exemplary techniques 500 and 520 for repairing mesh-covered composite laminate components using an exemplary structural adhesive film described in FIG. 3. Specifically, FIG. 5a illustrates an exemplary technique 500 for the repair of non-through penetration of a mesh-covered carbon fiber reinforced component. Additionally, FIG. 5b illustrates an exemplary technique 520 for the repair of through-penetration of a carbon fiber reinforced component.

Repair technique 500 may be performed on a carbon fiber reinforced component 502, which may be a carbon fiber reinforced plastic (CFRP) component. The carbon fiber reinforced component 502 may include multiple plies 504 of carbon fiber laminates. Moreover, the carbon fiber reinforced component 502 may also include a conductive mesh 506, which may be positioned on the surface of the plies 504. The conductive mesh 506 may be electrically coupled to a suitable ground for dissipating electrical discharges away from the composite laminate assembly.

As shown in FIG. 5a, carbon fiber reinforced component 502 may include a non-through penetration repair area 508, (e.g., dents, cracks, fissures, etc.). The repair area 508 may be prepared for repair by the removal of portions from successive layers of plies to form a tapered recess 510. Moreover, the corners of the recess 510 may also be rounded off. The removal of portions from successive layers to form the recess 510 may be accomplished using any suitable manufacturing tool or process, such as a high-speed grinder. The tapering of the recess 510 may be adjusted as a function of the load experienced by the carbon fiber reinforced component 502. For instance, if the carbon fiber reinforced component 502 experiences a light load, a steep taper may be used. However, if the carbon fiber reinforced component 502 is subjected to a heavy load, a more gradual taper grade may be utilized.

The repair technique 500 includes the placement of a structural adhesive film 512 into the recess 510. The structural adhesive film 512 may be a conductive structural adhesive film, such as those described above and shown in FIG. 3. One or more plies of replacement laminates 514 may then be placed over the adhesive film 512 to at least partially restore the repair area 508.

Subsequently, a conductive scrim embedded structural adhesive film 516 is placed on top of the one or more plies of replacement laminates 514. The structural adhesive film 516 may be the structural adhesive film described above and shown in FIG. 3. The structural adhesive film 516 may be positioned so that at least a portion of its embedded conductive scrim makes electrical contact with the conductive mesh 506. According to various embodiments, sufficient electrical contact between the conductive scrim the conductive mesh 506 may be formed in such a way as to enable the dispersal of a lightning electrical discharge from the non-thorough penetration repair area 508. Subsequently, one or more top plies of replacement laminates 518 may be adhered to the structural adhesive film 516 to complete the repair. In some embodiments, additional plies of laminates (not shown) may be further placed on the replacement laminates 518 to provide additional strength to the repair. The structural adhesive film 516 is configured to conduct electrical discharges away from the repaired area 508, provided sufficient electrical conductivity is established to the conductive mesh 506 that is disposed on the surface of the carbon fiber reinforced component 502.

FIG. 5b illustrates an exemplary technique 520 for the repair of through-penetration of a carbon fiber reinforced component. Repair technique 520 may be performed on a carbon fiber reinforced component 522, which may be a carbon fiber reinforced plastic (CFRP) component. The carbon fiber reinforced component 522 may include multiple plies 524 of carbon fiber laminates. Moreover, the carbon fiber reinforced component 522 may also include a conductive mesh 526, which positioned on the surface of the plies 524. The conductive mesh 526 may be electrically coupled to a suitable ground for dissipating electrical discharges away from the composite laminate assembly.

As shown in FIG. 5b, carbon fiber reinforced component 526 may include a through-penetration repair area 528, (e.g., a puncture that completely penetrates carbon fiber reinforced component 522). The repair area 528 may be prepared for repair in substantially the same way as the repair area 508 to form a tapered recess 530.

Additionally, the repair technique 520 includes the placement of one or more backup plies 532 on the inner side of through-penetration repair area 528. A structural adhesive film 534 is positioned into the tapered recess 530. The structural adhesive film 534 may be configured to bind to the one or more backup plies 532. The structural adhesive film 534 may be a conductive structural adhesive film described above and shown in FIG. 3. One or more plies of replacement laminates 536 may then be placed over the adhesive film 534 to at least partially restore the through-penetration repair area 528.

Subsequently, a conductive scrim embedded structural adhesive film 538 is placed on top of the one or more plies of replacement laminates 536. The structural adhesive film 538 may be the structural adhesive film described above and shown in FIG. 3. The structural adhesive film 538 may be positioned so that at least a portion of its embedded conductive scrim makes electrical contact with the conductive mesh 526. According to various embodiments, sufficient electrical contact between the conductive scrim and the conductive mesh 526 may be formed in such a way as to enable the dispersal of a lightning electrical discharge from the through-penetration repair area 528. Subsequently, one or more top plies of replacement laminates 540 may be adhered to the structural adhesive film 538 to complete the repair. In some embodiments, additional plies of laminates (not shown) may be further placed on the replacement laminates 540 to provide additional strength to the repair. The structural adhesive film 538 is configured to conduct electrical discharges away from the repair, provided sufficient electrical conductivity is established in the conductive mesh 526 that is disposed on the surface of the carbon fiber reinforced component 522.

Figure 6A:
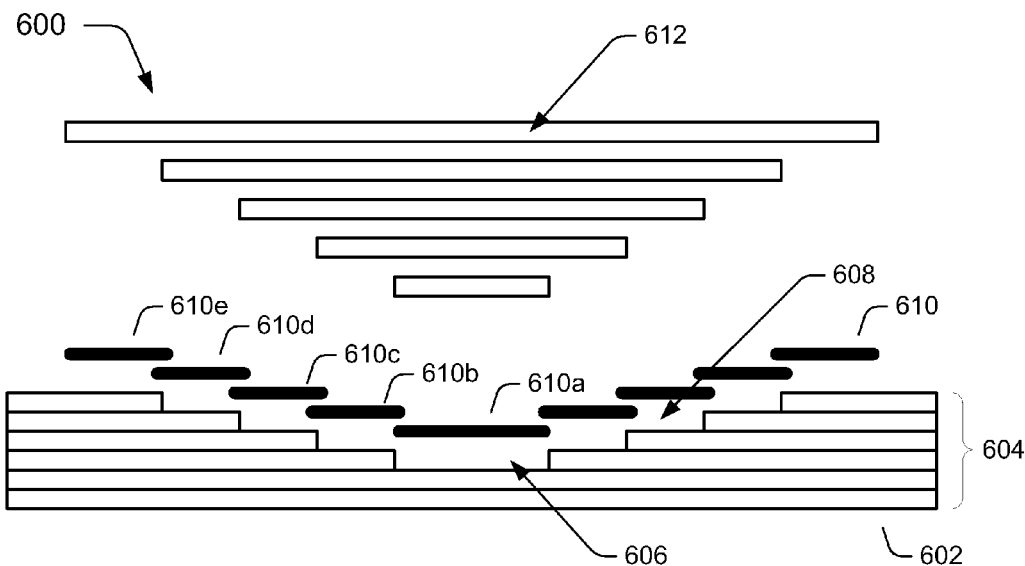
FIGS. 6a and 6b are side views of exemplary step techniques for repairing composite laminate components using an exemplary structural adhesive film described in FIG. 3.
Figure 6B:
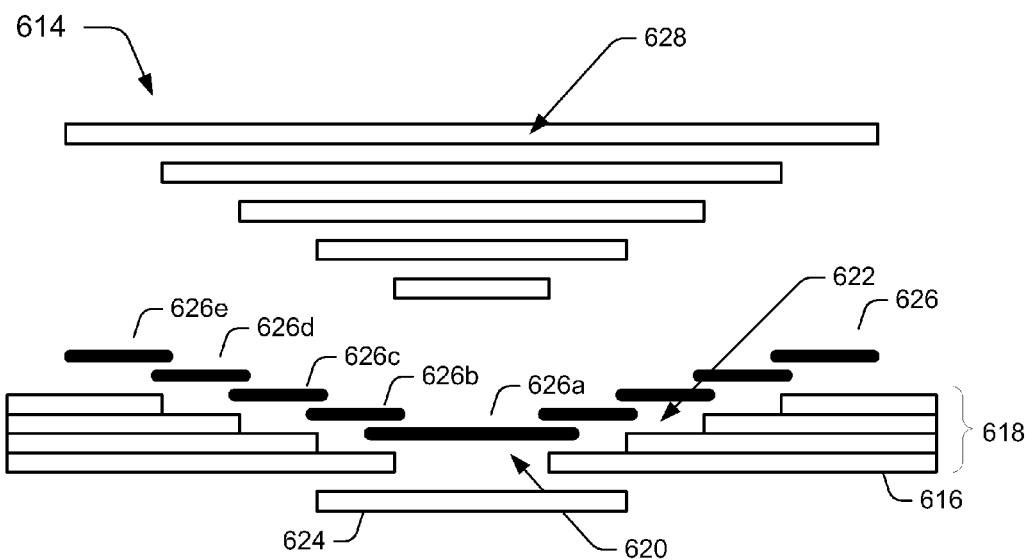

FIGS. 6a and 6b are side views of exemplary techniques 600 and 614 for repairing composite laminate components using an exemplary structural adhesive film described in FIG. 3. Specifically, FIG. 6a illustrates an exemplary technique 600 for the repair of non-through penetration to a carbon fiber reinforced component. Additionally, FIG. 6b illustrates an exemplary technique 614 for the repair of through-penetration to a carbon fiber reinforced component. Exemplary repair techniques 600 and 620 may be referred to herein as a "step" repair technique.

Repair technique 600 may be performed on a carbon fiber reinforced component 602, which may be a carbon fiber reinforced plastic (CFRP) component. The carbon fiber reinforced component 602 may include multiple plies 604 of carbon fiber laminates.

As shown in FIG. 6, carbon fiber reinforced component 602 may include a non-through penetration repair area 606, (e.g., dents, cracks, fissures, etc.) that is prepared for step repair. Specifically, the repair area 606 may be prepared for repair by the removal of portions from successive layers of plies to form a stepped recess 608. The corners of the recess 608 may also be rounded off to remove burrs. Unlike in "scarf" repair, however, the stepped recess 608 may be achieved by removing material from each ply in a step-like fashion via any suitable manufacturing tool or process, such as, without limitations, routering cutting or milling.

The repair technique 600 includes the placement of a plurality of conductive scrim embedded structural adhesive films 610 into the stepped recess 608. The structural adhesive films 608 may be the structural adhesive films described above with respect to FIG. 3.

For each "step" of the recess, a conductive scrim embedded structural adhesive film 610 may be positioned so that at least a portion of the embedded conductive scrim makes electrical contact with the embedded conductive scrim of an adjoining structural adhesive film 610. For example, as shown in FIG. 6a, conductive scrim embedded structural adhesive film 610a may be disposed so as to make electrical contact with portion 610b. In turn, portion 610b may be disposed to make electrical contact with portion 610c, and so on and so forth for 610d and 610e. Simultaneously, one or more plies of replacement laminates 612 may be alternatively inter-dispersed over each layer of structural adhesive film 610 to restore the repair area 606.

The electrical contacts between the adhesive films 610a-610e may act to ensure that any lightning discharges directed to the replacement laminates 612 is adequately conducted away into the surrounding plies 604 of carbon fiber laminates. Thus, the electrical discharge from the lightning may be dispersed from the non-through penetration repair area 606 to a bigger area to minimize its impact. In some implementations, the electrical discharge may also travel to one or more electrical discharge features.

FIG. 6b illustrates an exemplary technique 614 for the repair of through-penetration of a carbon fiber reinforced component. Repair technique 614 may be performed on a carbon fiber reinforced component 616, which may be a carbon fiber reinforced plastic (CFRP) component. The carbon fiber reinforced component 616 may include multiple plies 618 of carbon fiber laminates.

As shown in FIG. 6b, carbon fiber reinforced component 616 may include a through-penetration repair area 620, (e.g., a puncture that completely penetrates carbon fiber reinforced component 616). The repair area 620 may be prepared for repair in substantially the same way as the repair area 606 to form a tapered recess 622.

Additionally, the repair technique 614 includes the placement of one or more backup plies 624 on the inner side of through-penetration repair area 620. A conductive scrim embedded structural adhesive film, such as adhesive film 626a, may be positioned into the tapered recess 622 so as to contact one of the backup plies 624. Further, For each "step" of the tapered recess, a conductive scrim embedded structural adhesive film 626 may be positioned so that at least a portion of the embedded conductive scrim makes electrical contact with the embedded conductive scrim of an adjoining structural adhesive film 626. For example, as shown in FIG. 6b, conductive scrim embedded structural adhesive film 626a may be disposed so as to make electrical contact with portion 626b. In turn, portion 626b may be disposed to make electrical contact with portion 626c, and so on and so forth for 626d and 626e. Simultaneously, one or more plies of replacement laminates 628 may be alternatively inter-dispersed over each layer of structural adhesive film 626 to restore the repair area 620.

The electrical contacts between the adhesive films 626a-626e may act to ensure that any lightning discharges directed to the replacement laminates 628 is adequately conducted away into the surrounding plies 618 of carbon fiber laminates. Thus, the electrical discharge from the lightning may be dispersed from the non-through penetration repair area 620 to a bigger area to minimize its impact. In some implementations, the electrical discharge may also travel to one or more electrical discharge features.

Figure 7A:
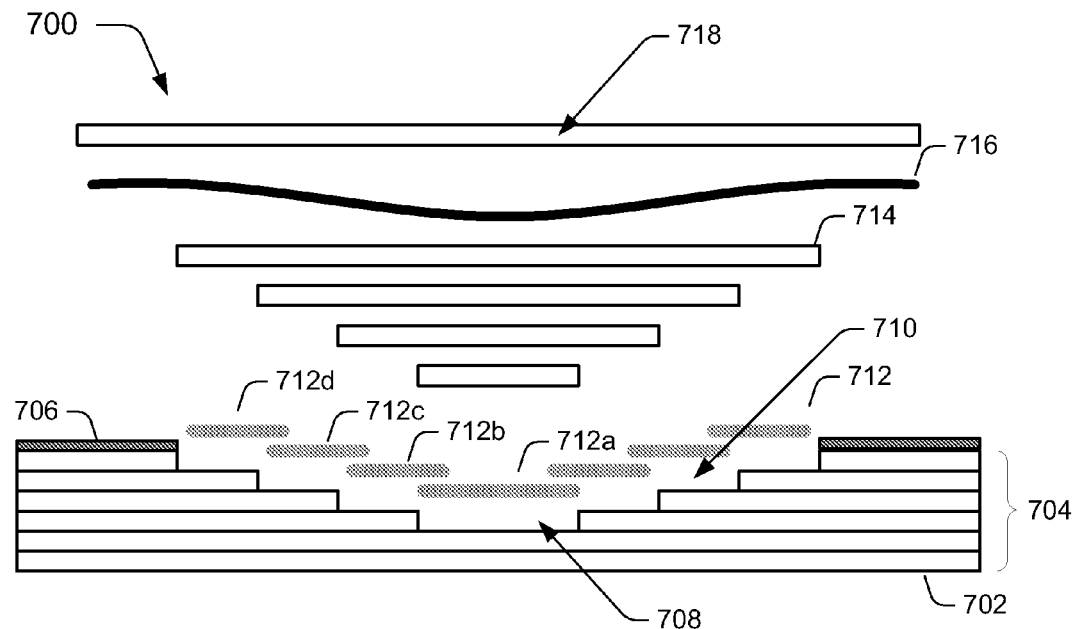
FIGS. 7a and 7b are side views of exemplary step techniques for repairing mesh-covered composite laminate components using an exemplary structural adhesive film described in FIG. 3.
Figure 7B:
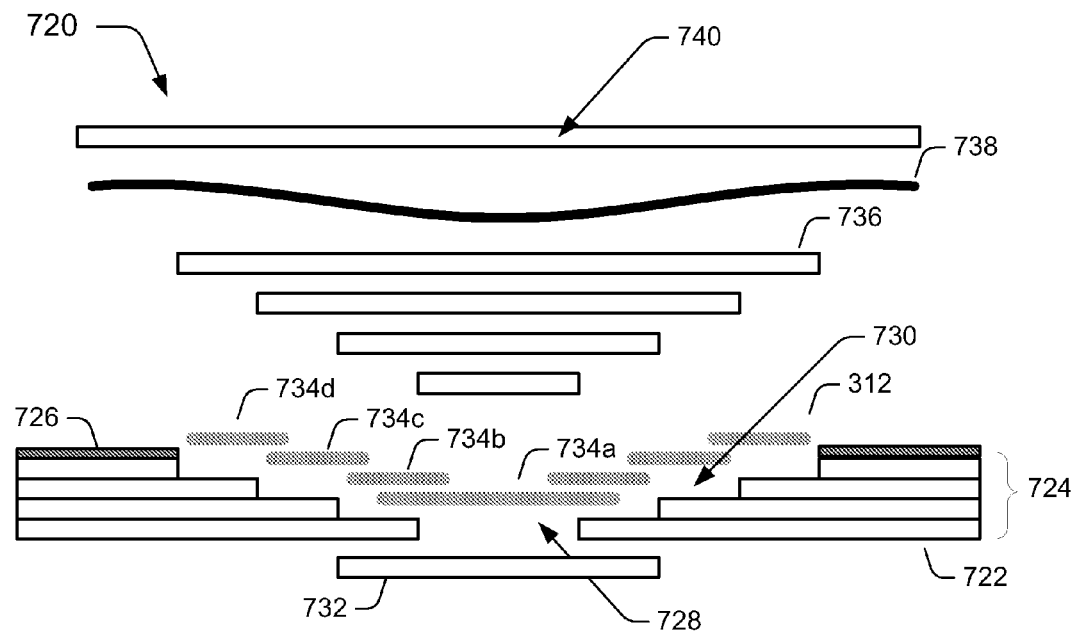

FIGS. 7a and 7b are side views of exemplary techniques 700 and 720 for repairing mesh-covered composite laminate components using an exemplary structural adhesive film described in FIG. 3. Specifically, FIG. 7a illustrates an exemplary technique 700 for the repair of non-through penetration of a mesh-covered carbon fiber reinforced component. Additionally, FIG. 7b illustrates an exemplary technique 720 for the repair of through-penetration to a carbon fiber reinforced component.

Repair technique 700 may be performed on a carbon fiber reinforced component 702, which may be a carbon fiber reinforced plastic (CFRP) component. The carbon fiber reinforced component 702 may include multiple plies 704 of carbon fiber laminates. Moreover, the carbon fiber reinforced component 702 may also include a conductive mesh 706, which positioned on the surface of the plies 704. The conductive mesh 706 may be electrically coupled to a suitable ground for dissipating electrical discharges away from the composite laminate assembly.

As shown in FIG. 7a, carbon fiber reinforced component 702 may include a non-through penetration repair area 708, (e.g., dents, cracks, fissures, etc.). The repair area 708 may be prepared for repair by the removal of portions from successive layers of plies to form a stepped recess 710. Moreover, the corners of the stepped recess 710 may also be rounded off to remove burrs. The removal of portions from successive layers to form the stepped recess 710 may be accomplished using any suitable manufacturing tool or process, such as, without limitation, a high-speed grinder. The length of each step in the recess 710 may be adjusted as a function of the load experienced by the carbon fiber reinforced component 702. For instance, if the carbon fiber reinforced component 702 experiences a light load, a shorter step may be used. However, if the carbon fiber reinforced component 702 is subjected to a heavy load, a longer step may be utilized.

The repair technique 700 includes the placement of structural adhesive films 712 into the recess 710. The structural adhesive films 712 may be the conductive structural adhesive film described above and shown in FIG. 3. Further, a conductive scrim embedded structural adhesive film 712 may be positioned on each "step" of the recess 710.

In the implementations where the structural adhesive films 712 may include conductive structural adhesive films, each of the structural adhesive, films 712 may be positioned so that at least a portion of the embedded conductive scrim makes electrical contact with the embedded conductive scrim of an adjoining structural adhesive film 712. For example, as shown in FIG. 7a, conductive scrim embedded structural adhesive film 712a may be disposed so as to make electrical contact with portion 712b. In turn, portion 712b may be disposed to make electrical contact with portion 712c, and so on and so forth. Simultaneously, one or more plies of replacement laminates 714 may be inter-dispersed over each layer of structural adhesive film 712 to restore the repair area 708.

In such implementations, the electrical contacts between the adhesive films 712a-712d may act to ensure that any lightning discharges directed to the replacement laminates 714 is adequately conducted away into the surrounding plies 704 of carbon fiber laminates. Thus, the electrical discharge from the lightning may be dispersed from the non-through penetration repair area 708 to a bigger area to minimize its impact.

Subsequently, a conductive scrim embedded structural adhesive film 716 is placed on top of the one or more plies of replacement laminates 714. The structural adhesive film 716 may be the structural adhesive film described above and shown in FIG. 3. The structural adhesive film 716 may be positioned so that at least a portion of its embedded conductive scrim makes electrical contact with the conductive mesh 706. According to various embodiments, sufficient electrical contact between the conductive scrim the conductive mesh 706 may be formed in such a way as to enable the dispersal of a lightning electrical discharge from the non-through penetration repair area 708. Subsequently, one or more top plies of replacement laminates 718 may be adhered to the structural adhesive film 716 to complete the repair. In some embodiments, additional plies of laminates (not shown) may be further placed on the replacement laminates 718 to provide additional strength to the repair. The structural adhesive film 716 is configured to conduct electrical discharges away from the repair, provided sufficient electrical conductivity is established to the conductive mesh 706 that is disposed on the surface of the carbon fiber reinforced component 702.

FIG. 7b illustrates an exemplary technique 720 for the repair of through-penetration of a carbon fiber reinforced component. Repair technique 720 may be performed on a carbon fiber reinforced component 722, which may be a carbon fiber reinforced plastic (CFRP) component. The carbon fiber reinforced component 722 may include multiple plies 724 of carbon fiber laminates. Moreover, the carbon fiber reinforced component 722 may also include a conductive mesh 726, which may be positioned on the surface of the plies 724. The conductive mesh 726 may be electrically coupled to a suitable ground for dissipating electrical discharges away from the composite laminate assembly.

As shown in FIG. 7b, carbon fiber reinforced component 720 may include a through-penetration repair area 728, (e.g., a puncture that completely penetrates carbon fiber reinforced component 722). The repair area 728 may be prepared for repair in substantially the same way as the repair area 708 to form a stepped recess 730.

Additionally, the repair technique 720 includes the placement of one or more backup plies 732 on the inner side of through-penetration repair area 728. A structural adhesive film 734a may be positioned into the stepped recess 730 so as to contact one of the backup plies 732. Moreover, for each "step" of the recess 730, additional structural adhesive films 734, such as 734b-734e, may be placed. The structural adhesive films 734 may be the conductive structural adhesive film described above and shown in FIG. 3.

In the implementations where the structural adhesive films 734 may include conductive structural adhesive films, each of the structural adhesive films 734 may be positioned so that at least a portion of the embedded conductive scrim makes electrical contact with the embedded conductive scrim of an adjoining structural adhesive film 734. For example, as shown in FIG. 7b, conductive scrim embedded structural adhesive film 734a may be disposed so as to make electrical contact with portion 734b. In turn, portion 734b may be disposed to make electrical contact with portion 734c, and so on and so forth. Simultaneously, one or more plies of replacement laminates 736 may be alternatively inter-dispersed over each layer of structural adhesive film 734 to restore the repair area 728.

In such implementations, the electrical contacts between the adhesive films 734a-734b may act to ensure that any lightning discharges directed to the replacement laminates 736 is adequately conducted away into the surrounding plies 724 of carbon fiber laminates. Thus, the electrical discharge from the lightning may be dispersed from the non-through penetration repair area 728 to a bigger area to minimize its impact.

Subsequently, a conductive scrim embedded structural adhesive film 738 is placed on top of the one or more plies of replacement laminates 736. The structural adhesive film 738 may be the structural adhesive film described above and shown in FIG. 3. The structural adhesive film 738 may be positioned so that at least a: portion of its embedded conductive scrim makes electrical contact with the conductive: mesh 726. Subsequently, one or more top plies of replacement laminates 740 may be adhered to the structural adhesive film 738 to complete the repair. In some embodiments, additional plies of laminates (not shown) may be further placed on the replacement laminates 740 to provide additional strength to the repair. The structural adhesive film 738 is configured to conduct electrical discharges away from the repair, provided sufficient electrical conductivity is established to the conductive mesh 726 that is disposed on the surface of the carbon fiber reinforced component 722.

Figure 8A:
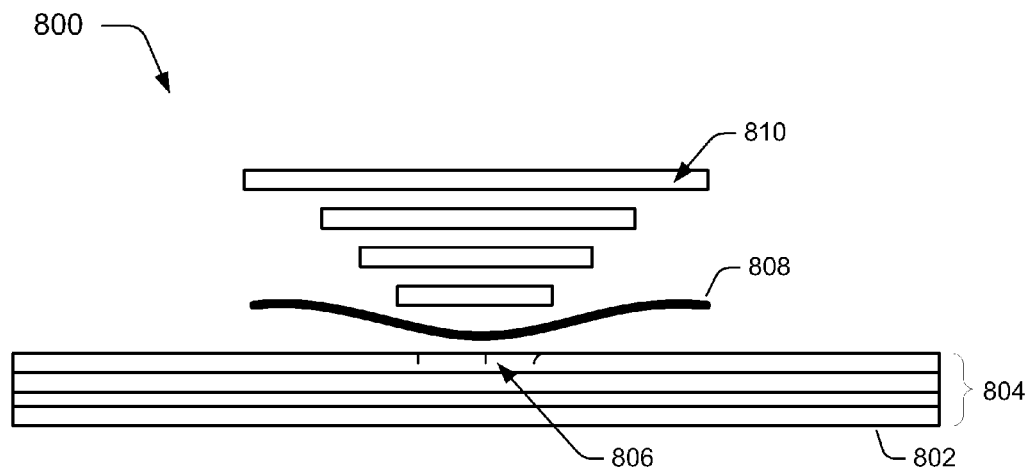
FIGS. 8a and 8b are side views of exemplary blister patch techniques for respectively repairing composite and mesh-covered composite laminate components, using an exemplary structural adhesive film described in FIG. 3.

FIG. 8a is a side view of an exemplary blister patch technique for repairing composite laminate components using an exemplary structural adhesive film described in FIG. 3. Typically, blister patch repairs are interim repairs that do not involve the removal of material from the damaged area. Rather, a patch that includes one or more repair laminate plies is affixed to the surface of the damaged area with an adhesive film layer.

Repair technique 800 may be performed on a carbon fiber reinforced component 802, which may be a carbon fiber reinforced plastic (CFRP) component. The carbon fiber reinforced component 802 may include multiple plies 804 of carbon fiber laminates. As shown in FIG. 8a, carbon fiber reinforced component 802 may include a repair area 806. For example, repair area 806 may have suffered some cracks or fissures.

A conductive scrim embedded structural adhesive film 808 is placed on top of the repair area 806 (e.g., cracks, fissures, etc.). The structural adhesive film 808 may be the structural adhesive film described above and shown in FIG. 3. One or more plies of supplemental laminates 810 may then be placed over the structural adhesive film 808 to cover up repair area 806.

It will be appreciated that the conductive scrim embedded structural adhesive film 808 is positioned between the multiple plies 804 and one or more plies of the supplemental laminates 810 such that sufficient electrical contact is established between the two assemblages of plies. This electrical contact may act to ensure that any lightning discharges directed to the supplemental laminates 810 is adequately conducted away into the multiple plies 804. Thus, the electrical discharge from the lightning may be dispersed from the supplemental plies 810 to a bigger area.

Figure 8B:
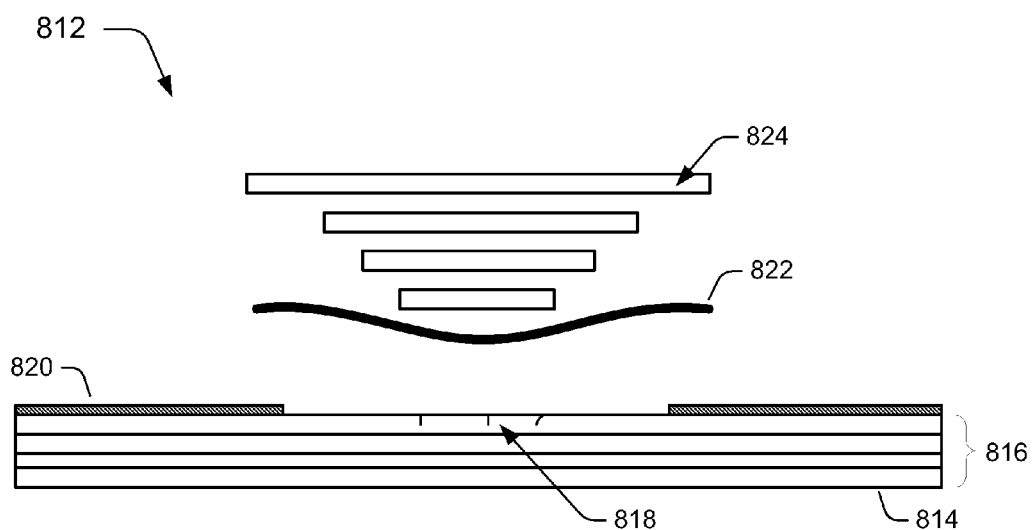

FIG. 8b is a side view of an exemplary blister patch technique for repairing mesh-covered composite laminate components using an exemplary structural adhesive film described in FIG. 3.

Repair technique 812 may be performed on a carbon fiber reinforced component 814, which may be a carbon fiber reinforced plastic (CFRP) component. The carbon fiber reinforced component 814 may include multiple plies 816 of carbon fiber laminates. As shown in FIG. 8b, carbon fiber reinforced component 812 may include a repair area 818. For example, repair area 818 may have suffered some surface or shallow inconsistencies. Moreover, the carbon fiber reinforced component 814 may be at least partially covered with a conductive mesh 820 that is electrically coupled to a suitable ground for dissipating electrical discharges away from the composite laminate assembly.

A conductive scrim embedded structural adhesive film 822 is placed on top of the repair area 818 (e.g., cracks, fissures, etc.). The structural adhesive film 818 may be the structural adhesive film described above and shown in FIG. 3. One or more plies of supplemental laminates 824 may then be placed over the structural adhesive film 820 to cover up repair area 818. The conductive scrim embedded structural adhesive film 820 may be positioned so that at least a portion of its embedded conductive scrim makes electrical contact with the conductive mesh to enable the dispersal of a lightning electrical discharge from the repair area 818.

It will be appreciated that while certain exemplary repair techniques using a structural adhesive film that includes an embedded conductive scrim are illustrated above, the structural adhesive film may be used in other repair techniques where non-conductive structural adhesive films are used. For example, in additional to the repair of external carbon fiber reinforced components that are reachable by lightning, the conductive scrim embedded structural adhesive film may also be used for the repair of various internal carbon fiber reinforced components.

In particular embodiments, the scrim embedded structural adhesive film may be used for the repair of components implemented in electrostatic discharge sensitive applications, such as the repair of fuel tanks or cells that include carbon fiber reinforced components. Nevertheless, it will be appreciated that regardless of the particular repair technique implemented, the conductive scrim embedded structural adhesive film, such as the film 300 describe in FIG. 3, may facilitate the dispersion of the electrical discharges away from the repaired area.

Figure 9:
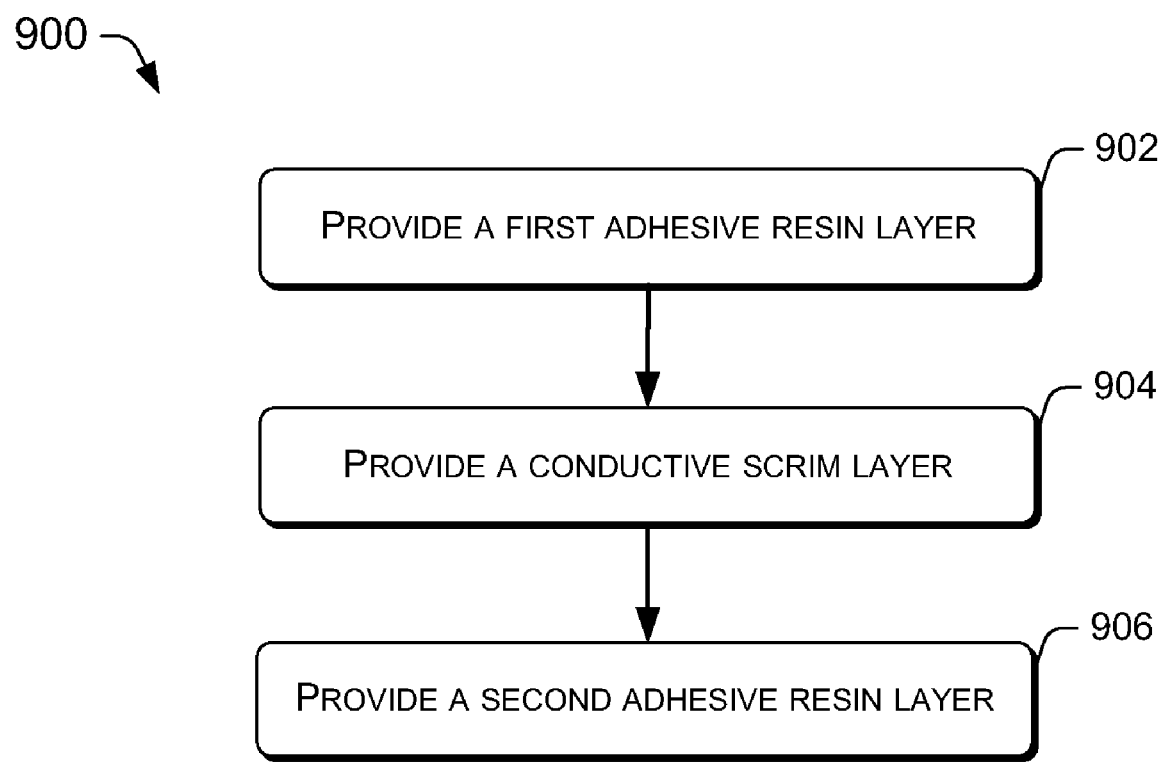
FIG. 9 is a flow diagram illustrating an exemplary process for creating a structural adhesive film that includes a conductive scrim in accordance with an embodiment of the present disclosure.

FIG. 9 is a flow diagram illustrating an exemplary process 900 for creating a structural adhesive film that includes a conductive scrim. The order in which the operations are described is not intended to be construed as a limitation, and any number of the described blocks can be combined in any order and/or in parallel to implement the process.

At block 902, a first resin adhesive layer may be provided. The resin adhesive layer is configured to be able to bond to a carbon fiber laminate ply, such as a carbon-fiber reinforced plastic (CFRP) ply. At block 904, a conductive scrim is provided, that is, bonded to the first resin adhesive layer. As described above, in some embodiments, the conductive scrim may be in the configuration of a mesh comprised of intersecting (or non-intersecting) strands of conductive fibers. The conductive fibers may include both metallic and non-metallic materials. In some implementation, the conductive scrim may be bond to the combination with an additional binding agent, e.g., resin adhesive. At block 906, a second resin adhesive layer may be provided to complete the structural adhesive film. In various embodiments, the second resin adhesive layer may have the same qualities as the first resin adhesive layer. Accordingly to various embodiments, the conductive scrim and the first and second resin adhesive layers may be combined during bonding such that the conductive scrim is infused with resin from one or more of the resin layers.

Figure 10:
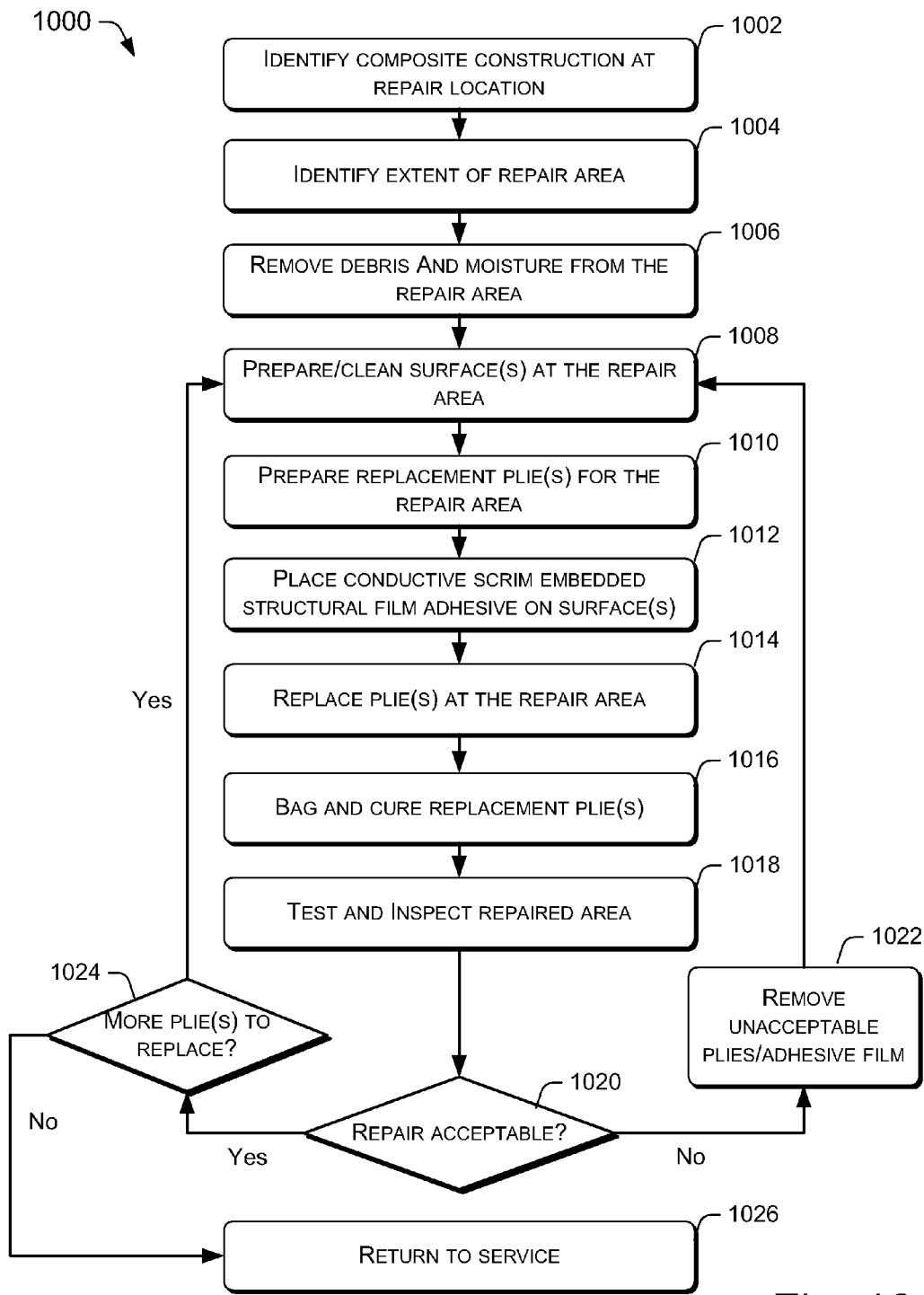
FIG. 10 is a flow diagram illustrating an exemplary process for conducting carbon fiber reinforced component repair using an structural adhesive film described in FIG. 3, in accordance with an embodiment of the present disclosure.

FIG. 10 is a flow diagram illustrating an exemplary process 1000 for conducting carbon fiber reinforced component repair using a structural adhesive film that includes a conductive scrim. The order in which the operations are described is not intended to be construed as a limitation, and any number of the described blocks can be combined in any order and/or in parallel to implement the process.

At block 1002, a repair person (or machine) may identify the composite configuration at a repair area on a carbon fiber reinforced component. For example, the repair person may identify the type of the composite laminate, the number of plies in the composite laminate, the ply orientations, the location of the conductive mesh with respect to the plies, and other factors. At block 1004, the repair person may identify the extent of the repair needed using any suitable detection method. The repair person may use, for example, visual inspection, microwave, acoustic, ultrasonic, or X-ray equipment, to identify the extent of the repair needed on the carbon fiber composite. In some instances, delamination in the repair area may be identified via sound generated by tapping on the delamination area. In other instances, the delamination in the repair area may be detected using instruments that generate sound waves and also detect the attenuation of the generated sound waves. Using these assessment means, the size and depth (e.g., the number of affected plies) of the repair area may be identified.

At block 1006, the repair person may remove debris and moisture from the repair area. The removed debris may include any foreign matter present in the repair area, as well as any plies needing replacement (e.g., delaminated plies) of the composite material. At block 1008, the repair person may prepare and clean one or more surfaces at the repair area. According to various embodiments, the preparation may involve grinding away the carbon fiber composite material to form a gradual tapered recess. Additionally, any corners in the repair area may be converted into circular or rounded shapes. Moreover, the repair person may prepare the tapered recess to expose at least a portion of any pre-existing conductive mesh that is present in the carbon fiber composite that is undergoing repair.

At block 1010, the repair person may prepare one or more replacement plies for the repair area. In most implementations, the replacement plies are prepared to match the orientation of the plies in the original structure. The replacement plies are configured to restore the repair area to at least its original shape and/or strength. However, in additional implementations, extra plies may be prepared for placement on top of the replacement plies.

At block 1012, a structural adhesive film is placed into the taper recess. According to various embodiments, the structural adhesive film may be a conductive structural adhesive film described in FIG. 3. In implementation where a conductive structural adhesive film is used, the conductive structural adhesive film may be positioned to provide electrical contact between the plies in the original structure and the replacement plies.

At block 1014, the repair person may place the laminate plies over the one or more layers the conductive scrim embedded structural adhesive film. The laminate plies may include replacement plies and if appropriate, extra plies. In most implementations, each of the replacement plies may be oriented to match each of the original plies in the carbon fiber reinforced component, and the one or more extra plies are oriented to match the original outer ply. Moreover, in implementations where a conductive mesh is present on the exterior of the original structure, an additional conductive structural adhesive film may be positioned adjacent to the conductive mesh. Specifically, the conductive scrim embedded structural adhesive film may be positioned so that at least a portion of the conductive scrim makes electrical contact with a portion of the pre-existing conductive mesh. For example, the electrical contact may be sufficient to conduct away lightning discharges from the repair area. Additional laminates plies may then be placed over the additional conductive structural adhesive film.

At block 1016, the repair person may perform a vacuum bag lay up of the repair area to debaulk and cure the added plies. The curing of the added plies may be accomplished by the aid of heating, such as by the use of heating blankets. However, in some alternative embodiments, the entire carbon fiber reinforced component under repair may be placed in an oven or autoclave to cure the added plies.

At block 1018, the repair person may test and inspect the repaired area. For example, the repair person may test and inspect the repaired area for delaminiations, proper curing, proper ply orientation, proper adhesion, and the like. In some implementations, an electrical conductivity test of the repaired area may be performed to ensure that the conductive scrim has been positioned to sufficiently enable the conduction of electrical charges away from the repaired area. For example, one particular method for performing an electrical conductivity test on composite materials, as disclosed in U.S. Patent Publication No. 2007/0096751 A1 to Georgeson et al., published on May 3, 2007, is hereby incorporated by reference.

At decision block 1020, the repair person may make a determination as to whether the repair is acceptable based on the test and inspection of the repair area. If a determination is made that the repair is not acceptable, ("no" at decision block 1020), the one or more unacceptable plies and, if necessary, the structural adhesive films associated with the one or more plies may be removed. Following removal, the process 1000 may loop back to block 1008 where the repair person may repeat the repair.

However, if the repair person makes a determination that the repair is acceptable, ("yes" at decision block 1020), the process 1000 may proceed to decision block 1024. At decision block 1024, a determination may be made as to whether the repair includes the replacement of additional plies. If there are more repair plies to be replaced, ("yes" at decision block 1024), the process 1000 may loop back to block 1008 where the repair person replaces additional laminate plies. However, if there are no more additional plies to be replaced, ("no" at decision block 1024), the carbon fiber reinforced component that includes the repaired area is then returned to service at block 1026.

Figure 11:
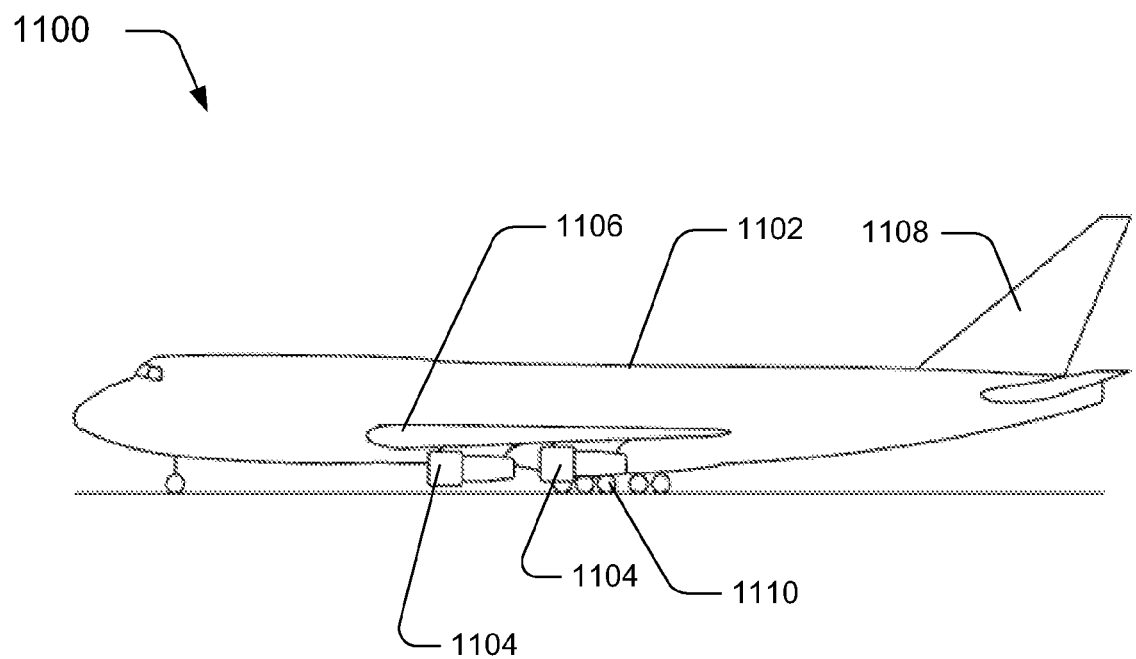
FIG. 11 is a side elevational view of an aircraft that includes a carbon fiber reinforced component that may be repaired with a conductive scrim embedded structural adhesive film, in accordance with another embodiment of the present disclosure.

FIG. 11 is a side elevational view of an aircraft 1100 that includes one or more carbon fiber reinforced components that may be repaired with a conductive scrim embedded structural adhesive film. Such aircraft may include, for example, and without limitation, the 787 model aircraft commercially-available from the Boeing Company of Chicago, Ill. As shown in FIG. 11, the aircraft 1100 includes one or more propulsion units 1104 coupled to a fuselage 1102, wing assemblies 1106 (or other lifting surfaces), a tail assembly 1108, a landing assembly 1110, a control system (not visible), and a host of other systems and subsystems that enable proper operation of the aircraft 1100. In various instances, at least a portion of the wing assemblies 1106 may include one or more carbon fiber reinforced components. In some instances, these components may be repaired using a structural adhesive film that includes a conductive scrim, as described in FIG. 3.

Moreover, the various embodiments of the conductive scrim embedded structural adhesive film may also be used to repair other vehicles that include electrically conductive carbon fiber exterior components. These vehicles may include ships, trains, and any other vehicles. The conductive scrim may advantageously protect the repaired carbon fiber reinforced components in these vehicles from lightning strikes and other electrical discharges, such as electrostatic discharges resulting from fuel electrification in fuel cells.

Embodiments of systems and methods in accordance with the present disclosure may provide significant advantages over the prior art. For example, a structural adhesive film that includes a conductive scrim may enable electrical discharges from lightning strikes to be conducted away from a repaired area of a carbon fiber reinforced component. Thus, the conductive scrim may advantageously minimize the effects of lightning strikes. Similarly, the conductive scrim may also be used to restore an electromagnetic field (EMF) shield and reduce or eliminate electrical arcing and thermal energy buildups from lightning strikes.

While embodiments of the disclosure have been illustrated and described above, many changes can be made without departing from the spirit and scope of the disclosure. Accordingly, the scopes of the embodiments are not limited by the disclosure. Instead, the embodiments of the disclosure should be determined entirely by reference to the claims that follow.

What is claimed is:

1. A method for using conductive scrim embedded structural adhesive films, comprising:
   providing a stepped recess that penetrates a surface of a repair area to remove a portion of a reinforced component, the reinforced component having an original outer shape;
   positioning a first conductive structural adhesive film that includes a first conductive scrim into the stepped recess that penetrates the surface of the repair area and at least partially on a first step of the stepped recess;
   inserting a first laminate ply into the stepped recess on top of the first conductive structural adhesive film;
   positioning a second conductive structural adhesive film that includes a second conductive scrim into the stepped recess so that the second conductive scrim is at least partially on a second step of the stepped recess and in contact with the first conductive scrim and the first laminate ply, the first step being further away from the surface of the repair area than the second step;
   inserting one or more second laminate plies into the stepped recess on top of the second conductive structural adhesive film to fill the repair area;
   disposing a third conductive structural adhesive film on top of the repair area, wherein the third conductive structural adhesive film includes a third conductive scrim;
   disposing one or more third laminate plies on top of the third conductive structural adhesive film; and
   curing the laminate plies disposed inside and on top of the repair area.

2. The method of claim 1, wherein the reinforced component includes at least one conductive layer, and wherein disposing a third conductive structural adhesive film includes establishing electrical contact between the third conductive scrim and a portion of the at least one conductive layer.

3. The method of claim 1, wherein the one or more second laminate plies are configured to restore the carbon fiber reinforced component to at least the original outer shape.

4. The method of claim 1, and wherein reinforced component includes a carbon fiber reinforced component, and wherein each of the first laminate plies, the second laminate plies, and the one or more third laminate plies include carbon fiber laminate plies.

5. The method of claim 1, wherein inserting one or more second laminate plies includes orienting each second laminate ply with the corresponding ply of the reinforced component.

6. The method of claim 1, wherein at least one of the first conductive scrim, the second conductive scrim, or the third conductive scrim includes metallic conductive fibers, the metallic conductive fibers include at least one of copper, aluminum, platinum, or silver fibers.

7. The method of claim 1, wherein providing a stepped recess including providing a stepped recess to a repair area that is located on a vehicle.

8. The method of claim 1, wherein providing a stepped recess including providing a stepped recess to a repair area that is located on an aircraft.

9. The method of claim 1, further comprising producing one or more conductive scrim embedded structural adhesive films, wherein producing each of the conductive scrim embedded structural adhesive films includes:
   providing a first carbon fiber ply and a second carbon fiber ply that do not include metallic conductive fibers;
   providing a first resin adhesive layer that binds to the first carbon fiber ply;
   providing a second resin adhesive layer that binds to the second carbon fiber ply; and
   providing a resin adhesive infused conductive scrim that is disposed between and bonded to the first resin adhesive layer that binds to the first carbon fiber ply and the second resin adhesive layer that binds to the second carbon fiber ply.

10. The method of claim 1, wherein at least one of the first conductive scrim the second conductive scrim, or the third conductive scrim includes randomly-oriented metallic conductive fibers.

11. A method for using conductive scrim embedded structural adhesive films, comprising:
   providing a stepped recess that penetrates a surface of a repair area to remove a portion of a reinforced component, the reinforced component having an original outer shape;
   positioning a first conductive structural adhesive film that includes a first conductive scrim into the stepped recess that penetrates the surface of the repair area and at least partially on a first step of the stepped recess;

inserting a first laminate ply into the stepped recess on top of the first conductive structural adhesive film;

positioning a second conductive structural adhesive film that includes a second conductive scrim into the stepped recess so that the second conductive scrim is at least partially on a second step of the stepped recess and in contact with the first conductive scrim and the first laminate ply, the first step being further away from the surface of the repair area than the second step;

inserting one or more second laminate plies into the stepped recess on top of the second conductive structural adhesive film to fill the repair area;

disposing a third conductive structural adhesive film on top of the repair area, wherein the third conductive structural adhesive film includes a third conductive scrim; and disposing one or more third laminate plies on top of the third conductive structural adhesive film.

12. The method of claim 11, wherein the reinforced component includes at least one conductive layer, and wherein disposing a third conductive structural adhesive film includes establishing electrical contact between the third conductive scrim and a portion of the at least one conductive layer.

13. The method of claim 11, and wherein reinforced component includes a carbon fiber reinforced component, and wherein each of the first laminate plies, the second laminate plies, and the one or more third laminate plies include carbon fiber laminate plies.

14. The system of claim 11, wherein inserting one or more second laminate plies includes orienting each second laminate ply with the corresponding ply of the reinforced component.

15. The method of claim 11, wherein at least one of the first conductive scrim, the second conductive scrim, or the third conductive scrim includes metallic conductive fibers.

16. The method of claim 11, wherein providing a stepped recess including providing a stepped recess to a repair area that is located on a vehicle.

17. The method of claim 11, wherein providing a stepped recess including providing a stepped recess to a repair area that is located on an aircraft.

18. The method of claim 11, further comprising producing one or more conductive scrim embedded structural adhesive films, wherein producing each of the conductive scrim embedded structural adhesive films includes:

providing a first carbon fiber ply and a second carbon fiber ply that do not include metallic conductive fibers;

providing a first resin adhesive layer that binds to the first carbon fiber ply;

providing a second resin adhesive layer that binds to the second carbon fiber ply; and providing a resin adhesive infused conductive scrim that is disposed between and bonded to the first resin adhesive layer that binds to the first carbon fiber ply and the second resin adhesive layer that binds to the second carbon fiber ply.

19. The method of claim 11, wherein at least one of the first conductive scrim, the second conductive scrim, and the third conductive scrim includes randomly-oriented metallic conductive fibers.

20. A method for using conductive scrim embedded structural adhesive films, comprising:

providing a stepped recess that penetrates a surface of a repair area to remove a portion of a reinforced component, the reinforced component having an original outer shape;

positioning a first conductive structural adhesive film that includes a first conductive scrim into the stepped recess that penetrates the surface of the repair area and at least partially on a first step of the stepped recess;

inserting a first laminate ply into the stepped recess on top of the first conductive structural adhesive film;

positioning a second conductive structural adhesive film that includes a second conductive scrim into the stepped recess so that the second conductive scrim is at least partially on a second step of the stepped recess and in contact with the first conductive scrim and the first laminate ply, the first step being further away from the surface of the repair area than the second step; and inserting one or more second laminate plies into the stepped recess on top of the second conductive structural adhesive film to fill the repair area.

21. The method of claim 20, further comprising positioning one or more third laminate plies under the surface of the repair area and on the stepped recess so that at least one of the one or more third laminate plies contacts the first conductive scrim.

22. The method of claim 20, and wherein reinforced component includes a carbon fiber reinforced component, and wherein each of the first and second laminate plies include carbon fiber laminate plies.

23. The method of claim 20, wherein at least one of the first conductive scrim or the second conductive scrim includes metallic conductive fibers.

24. The method of claim 20, wherein providing a stepped recess including providing a stepped recess to a repair area that is located on a vehicle or an aircraft.

25. The method of claim 20, further comprising producing one or more conductive scrim embedded structural adhesive films, wherein producing each of the conductive scrim embedded structural adhesive films includes:

providing a first carbon fiber ply and a second carbon fiber ply that do not include metallic conductive fibers;

providing a first resin adhesive layer that binds to the first carbon fiber ply;

providing a second resin adhesive layer that binds to the second carbon fiber ply; and providing a resin adhesive infused conductive scrim that is disposed between and bonded to the first resin adhesive layer that binds to the first carbon fiber ply and the second resin adhesive layer that binds to the second carbon fiber ply.

* * * * *